J. B. Pedrick.
Steam Engine Reverse.

Nº 90,019. Patented May 11, 1869.

Witnesses.
Lyndon W. Comstock
William Buchanan

Inventor.
Joseph B. Pedrick

United States Patent Office.

JOSEPH B. PEDRICK, OF COLUMBUS, INDIANA, ASSIGNOR TO HIMSELF AND JOSEPH F. GENT, OF SAME PLACE.

Letters Patent No. 90,019, dated May 11, 1869.

IMPROVEMENT IN STEAM-PIPES FOR REVERSING STEAM-ENGINES.

The Schedule referred to in these Letters Patent and making part of the same.

Be it known that I, JOSEPH B. PEDRICK, of the city of Columbus, in the county of Bartholomew, and State of Indiana, have invented a new and useful Improvement on the "Reverse for Steam-Engines," patented September 8, 1868, (and numbered 82,027,) by myself and Joseph F. Gent; and I do hereby declare that the following is a full, clear, and exact description of the construction and operation of the same, reference being had to the accompanying drawings, and to the letters of reference marked thereon.

Figure 1:
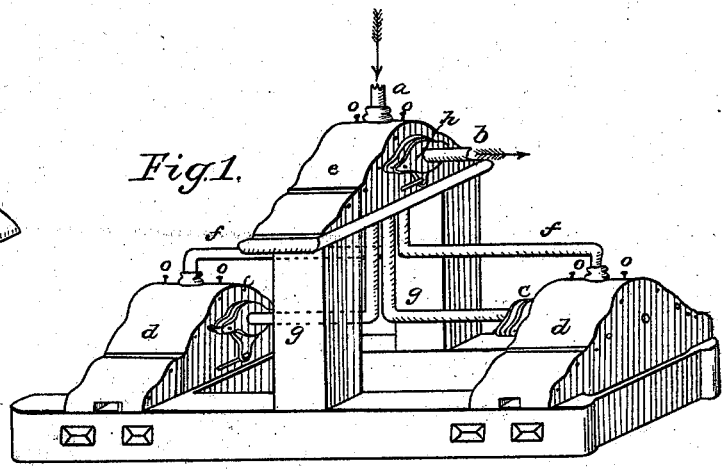

The nature of my invention consists in providing the valve-box $e$, the working-joint between the pipe $b$, and the stem of the valve in the valve-box $e$; also the working-joints $c$, between the pipes $g$ and the stems of the valves in the valve-boxes $d$, as shown in Figure 1, perspective view, thereby obviating the necessity of the plates and set-screws above the valves, as set forth in the patent above referred to.

Figure 2:
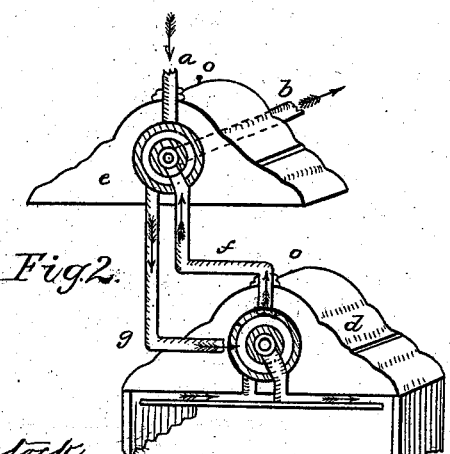

Figure 2 is a vertical sectional view, in which the course of the steam is indicated by the arrows.

The pipes $a$ or $b$ may either be connected with the boiler, as may be desired.

In case the pipe $b$ is connected with the boiler, the course of the steam would be the reverse of that indicated by the arrows.

Figure 4:
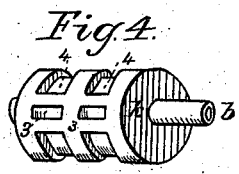

In Figure 4, $b$ is the stem of the valve, which stem has an opening through it, connecting with the openings 3 in the face of the valve $k$.

One of these openings, with one of the grooves 4, connects with the pipes $f g$ on the right, and the other with the pipes $f g$ on the left hand, as in fig. 1.

Figure 3:
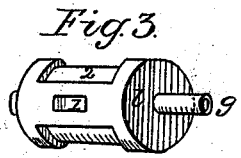

Figure 3 represents a valve, such as works within the valve-boxes $d$.

This valve has a hollow stem, $g$, which connects with the pipes $g$, perspective view.

Figure 6:
Figure 5:
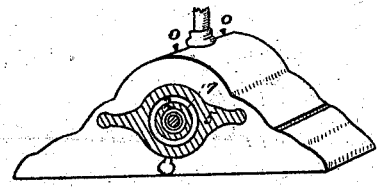

Figures 5 and 6 represent the working-joints between the pipes and valve-stems, in which 8 is a ring, fastened upon the end of the valve-stems. This is surrounded by the ring 7.

The part represented in fig. 6 is brought to the portion of fig. 5 marked 5, and securely bolted, thereby forming a working-joint.

The screws O are for the purpose of keeping the valves to their seats, should they not exactly fit the top of the valve-boxes, and also to prevent the springing of the stems of the valves.

What I claim, and desire to secure by Letters Patent, is—

1. The arrangement of the valve-box $e$, the joint $h$, between the pipe $b$ and the stem of the valve $k$, and the joints $c$, between the pipes $g$ and the stems of the valves in the valve-boxes $d$.

2. The hollow stems of the valves $k$ and $l$, substantially as shown and described.

JOSEPH B. PEDRICK.

Witnesses:
LYNDON W. COMSTOCK,
WILLIAM BUCHANAN.